Patented Apr. 18, 1950

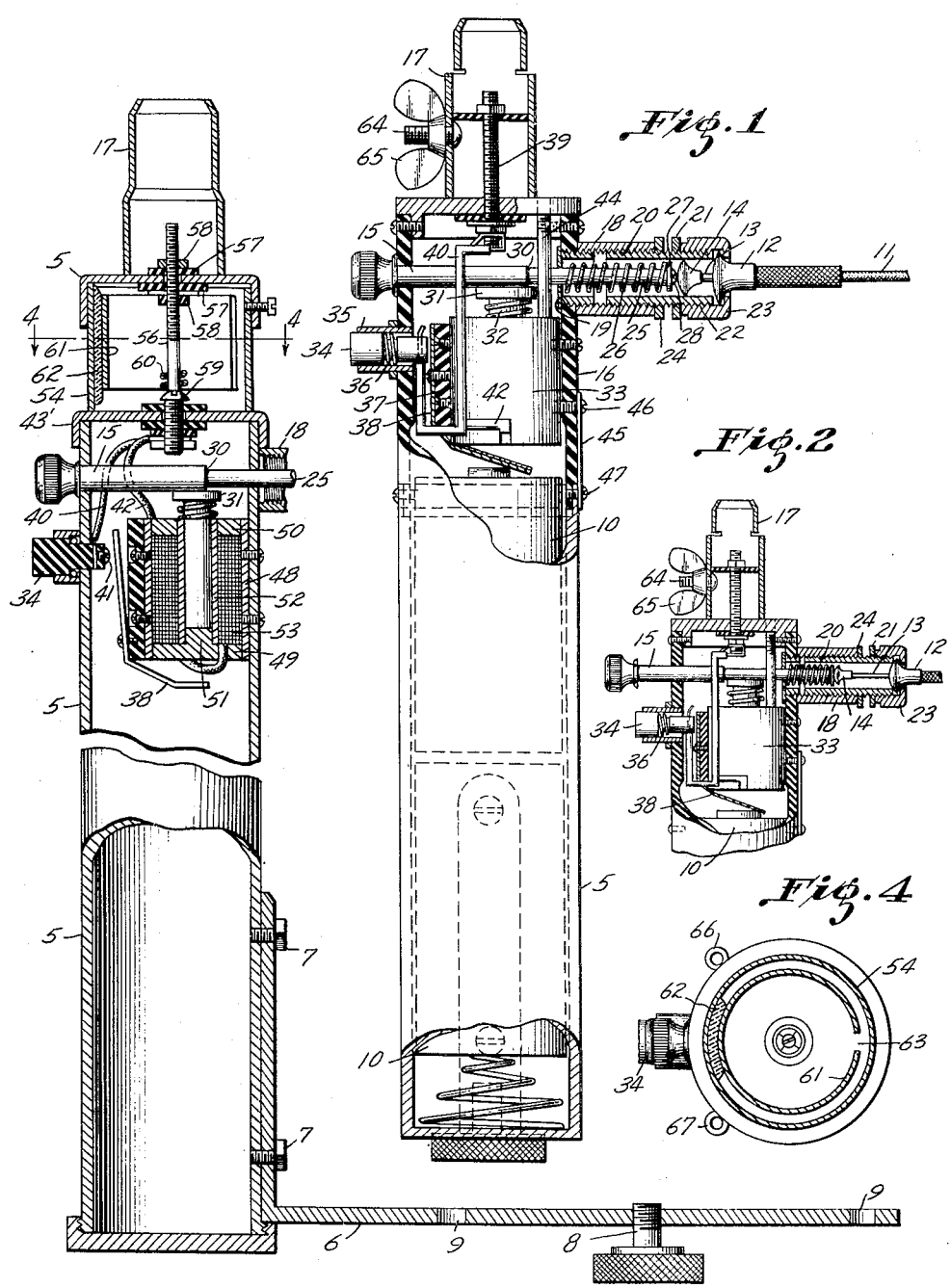

2,504,898

UNITED STATES PATENT OFFICE 2,504,898

PHOTOGRAPHIC LIGHT SYNCHRONIZER

William A. Steenbergen, Spokane, Wash.

Application March 18, 1946, Serial No. 655,335

1 Claim. (Cl. 95—11.5)

My invention relates to a photographic light synchronizer for synchronizing the opening of a camera shutter with the peak light intensity of a flash bulb. In synchronizers of this character the flash bulb is usually energized from a battery which also may furnish the energy for operating an electrical trip device that initiates release of the shutter. In accordance with my invention the cable release for the camera shutter is attached to the synchronizer unit in such a way that the actuation of the cable release is under the control of a spring that is so mounted as to make it easy to install a spring of the proper strength and to adjust the cable release to spring connection to take care of variations in cable travel and forces necessary to actuate the cable release for a wide range of cameras.

I have found that the changes in springs and travel of cable release can be made without affecting the timing to such an extent as to interfere with proper synchronized action between the flash bulb and the shutter. Some cameras require a much stronger spring to actuate the cable release than others, but with my device adequate spring strength can be employed without upsetting the timing.

In devices of this character the drain of current from the dry cell batteries used is an important factor. I have so constructed my synchronizer as to obtain adequate power to trip a latch holding the cable driving spring tensioned, even with the strongest spring that may be necessary to actuate the cable, with a very light drain on the battery.

It is, therefore, the principal purpose of my invention to provide a simple efficient means for actuating the camera shutter release cable in proper timed relation to the peak light output of the flash bulb.

It is a further purpose of my invention to provide, in a synchronizer of this character, a novel electrically operated trip mechanism for the cable release which is substantially unaffected by cable resistance, and which will be positive in operation at all times.

Other objects and advantages of my invention will appear more fully from the following description and the accompanying drawings wherein a preferred embodiment of the invention is shown. It should be understood, however, that the drawings and description are illustrative only and should not be taken as limiting the invention except insofar as it is limited by the claim.

In the drawings:

Figure 1 is a view in side elevation and partly in section of a synchronizer involving my invention;

Figure 2 is a similar view of a reduced scale showing the parts in changed position;

Figure 3 is a view similar to Figure 1 but showing an all metal construction which is adapted to take either standard or intermediate stem flash bulbs; and Figure 4 is a sectional view on the line 4—4 of Figure 3.

Referring now to the drawings, my synchronizer is embodied in a casing 5 which may be constructed of any suitable material. The casing 5 is preferably cylindrical shaped and has a bracket 6 fastened thereto by screws 7. The bracket 6 carries an attaching screw 8 for mounting upon the camera. The screw 8 is adapted to be secured to the camera in the usual place for attaching the camera to a tripod. The bracket 6 has a series of apertures 9 to accommodate it to different size cameras.

In my synchronizer I employ ordinary dry cell batteries 10 for energizing the flash bulb and for controlling the actuation of the shutter release cable. The shutter release cable is shown at 11. It has the usual terminal head 12 and plunger 13, the plunger, of course, having an operating head 14. My synchronizer provides a spring powered plunger for driving the head 14 in a direction to force the plunger 13 to shutter trip position. The spring driven plunger is shown at 15 and it is mounted transversely on the casing 5 near the top thereof. The casing 5 illustrated in Figure 1 has a transparent section 16 which carries the flash bulb socket 17, the plunger 15, and the electrically energized control means for the plunger 15.

The construction is such as to permit ready adjustment of the synchronizer for proper travel of the plunger 13 to actuate the shutter. I mount a sleeve 18 on the side wall of the casing 5. In Figure 1 of the drawings this sleeve is secured by a threaded cap 19, the head of which is inside the casing and the stem of which threads into the sleeve 18. In the type of casing shown in Figure 3, the sleeve 18 is welded or brazed to the cylindrical casing 5. The sleeve 18 is threaded on its interior throughout its length to receive another sleeve 20 that has a flange 21 thereon. The sleeve 20 extends beyond the flange 21 as indicated at 22 and is threaded to receive a cap 23 which serves to clamp the terminal head 12 of the shutter release cable against the sleeve portion 22. The interior of the sleeve 20 is of such size as to readily receive the head 14 of the plunger 13. A lock nut 24 holds the sleeve 20 in the desired adjusted position.

The plunger 15 has a reduced portion 25 on which a plunger actuation spring 26 is coiled. A washer 27 holds the spring 26 on the portion 25 and the washer is secured by a screw 28. It is believed to be evident that, if the plunger 15 is pulled to the left from the position shown in Figure 1 and then released, the spring 26 will drive it to the right and thus force the plunger 13 in the proper direction to trip the camera shutter. I find that there are a great many variations in cameras in the length of travel necessary for the plunger 13 to trip the shutter and in the resistance of the plunger 13 and the cable release to the applied force for tripping the shutter. It is therefore necessary to adapt the spring force of the plunger 15 to the particular shutter release mechanism attached by the cap 23. The spring 26 may be changed readily to accommodate the particular shutter release of the camera to which the synchronizer is attached. The stem 20 can be moved in or out to take care of the length to which the plunger 13 is exposed beyond the head 12. I find that there is so little difference between the time necessary to depress the plunger 13 to release the shutter by a heavy spring operating to depress a plunger having a high resistance and the time necessary to depress the plunger by a light spring operating to depress an easily moved plunger, that this factor may be completely ignored in the timing of the flash bulb with the shutter release. In other words, changing of the spring 26 to accommodate a particular shutter release cable does not make it necessary to readjust the synchronizer for proper timing.

Referring now to the particular means by which the plunger 15 is controlled, it will be appreciated from the showing that the plunger is withdrawn (or cocked) by hand. There is a shoulder 30 where the reduced portion 25 of the plunger meets the main portion thereof. This straight shoulder is located to engage the head 31 of a solenoid core on plunger 32 of a solenoid 33. The movement of the head 31 is directly at right angles to the movement of the plunger 15 so that there are no intermediate parts that affect the release of the plunger 15. The timing of the peak light intensity of the flash bulb with the release of the plunger after the circuit of the solenoid 33 is closed is entirely a function of the time lag in the solenoid 33 and the time lag of the flash bulb itself. The core 32 and the plunger 15 are both rotatable so there is ample wearing capacity to provide a long life for these parts.

The solenoid 33 and the flash bulb are energized from the battery 10 by depressing a plunger 34 that is mounted in a sleeve 35 on the casing 5. This plunger is normally held in the position shown in Figures 2 and 3 by a spring 36 in the sleeve 35. A contact carrying plate 37 of insulation is secured on the solenoid 33 and carries a contact strip 38, the lower end of which engages the central terminal contact of the top battery 10. A central terminal 39 of the flash bulb socket is connected by a conductor 40 to a screw 41 that is mounted in the inner end of the plunger 34. When the plunger 34 is depressed, the head of the screw 41 is engaged with the strip 38 to provide a path for the current from the batteries over the strip 38, the screw 41, the conductor 40 and the terminal 39 to the flash bulb. Likewise, a conductor 42 is connected to the terminal 39 so that the coil of the solenoid has one end connected to the center terminal of the top battery 10 when the screw 41 engages the strip 38. The return circuit for the flash bulb is through the socket 17, its base 43, and, as shown in Figure 1, over a rod 44 to the solenoid case 33. The energizing coil of the solenoid has one end connected to the casing 33. Since the casing section 16 will not conduct current to the shell 5, to which the other end of the battery is grounded, a strip 45 of metal is connected from another screw 46, that secures the solenoid to the section 16, to a screw 47 in the metallic casing 5.

In the construction shown in Figure 3, the circuit is somewhat simplified because of the fact that the insulating section 16 is dispensed with and the metallic casing 5 forms a return circuit from the sleeve 17 to the battery 10. In this form of invention the exposing of the conductor 40 where it is connected to the plunger 34 of insulation serves to ground one end of the conductor 40 on to the casing 5 when the plunger is not depressed. This means that the coil of the solenoid is short-circuited at all times except when the plunger 34 is depressed. Figure 3 illustrates the general construction of the solenoid. It consists of a cylindrical shell 48 of magnetic material, such as soft iron, two end disks 49 and 50 of the same material, the disk 49 having a pole piece 51 projecting inwardly therefrom. A non-magnetic sleeve 52 is fitted over the pole piece 51 and forms a guide for the plunger 32 of the solenoid. This construction provides a closed magnetic circuit for the solenoid with the exception of the thin brass sleeve 52 and the gap between the plunger 32 and the pole piece 51. The coil 53 of the solenoid is wound about the sleeve 52 which has a press fit on the portion 51. The disks 49 and 50 also are pressed into the cylinder 48 so that a very efficient magnetic circuit for the solenoid is obtained. This is important in the life of the synchronizer because it cuts down the necessary consumption of current from the batteries and thus prolongs the time a group of batteries may be used to operate the synchronizer.

Owing to the very simple and direct connection by the plunger 15 and the solenoid plunger, I am able to obtain the proper timing solely by the positioning of the plunger 15 with respect to the retracted position of the solenoid head 31. It will be appreciated that if the core 32 is pulled further out, a greater build-up of magnetic force must take place in the solenoid before the core will be drawn inward. I can therefore change the timing by the simple expedient of moving the plunger 15 further away from the solenoid 33. These timing adjustments are all made in the initial manufacture of the synchronizer because the time lag of the flash bulb is known and my synchronizer need not be adjusted for time lag after it leaves the factory.

Figures 3 and 4 illustrate a form of mounting for the flash bulbs that is readily adaptable to either standard bulb stems or the intermediate size. In this construction the cap 43′ has an upwardly extending sleeve 54 which mounts a cap 55 that in turn carries the intermediate socket 17. A contact rod 56 is secured in the cap 55 by insulating members 57 and nuts 58 that are threaded on the contact rod 56. This rod extends down and engages a screw 59 to establish a center contact for a standard bulb. A spring 60 is mounted on the screw 59 to insure a good contact between the rod 56 and the terminal 59. The sleeve 54 serves as a support for a socket member 61 to receive a standard flash bulb stem. This socket member is a split metal ring spaced from the sleeve 54 and having considerable resiliency so as to make a good engagement with the bulb stem. The socket member 61 is secured to the sleeve 54 at a point opposite the split portion by a bead of solder 62 which is poured in between the two parts and serves to unite them physically and electrically.

The flash bulbs are used with reflectors so as to concentrate the light in the proper direction. In order to mount the reflectors, I provide on the socket 17 a mounting bolt 64 and a wing nut 65 for clamping a reflector that sets down over the socket 17 in place. For mounting a reflector for a standard sized bulb, I provide two tubes 66 and 67 on the casing 5 near the top thereof (see Figure 4) and I employ a reflector having rods for mounting in the sleeves 66 and 67.

I am aware of course that there are many electrically controlled release devices or synchronizers for controlling the shutter release in timed relation to the peak light efficiency of the flash bulb. My device differs from these devices of which I am aware, by employing a direct spring loaded shutter release plunger and controlling the shutter release to give the proper time lag by a solenoid the core of which directly engages and controls the release of the spring loaded plunger. The synchronizing of the shutter release with the flash bulb is, therefore, placed entirely within the solenoid where there is no possibility of the timing being disturbed once it is properly set. The direct solenoid to the plunger connection has the additional advantage that it reduces the amount of power necessary to control the mechanism thus lengthening the life of the batteries.

Having thus described my invention, I claim:

A synchronizer of the character described comprising a cylindrical casing having means to mount a plurality of dry cell batteries therein, a solenoid mounted in the casing with its core movable axially of the casing and having its energizing coil provided with an electrical connection from one end thereof to the casing and the casing being electrically connected to one terminal of the batteries when they are mounted in the casing, a shutter release rod mounted for sliding movement transversely of the casing in proximity to said core, spring means urging said rod axially in one direction for shutter release, cooperating latch means on the core and the rod for holding the rod retracted against the force of said spring, a flash bulb socket on the casing, and means, including a switch, for electrically energizing the solenoid and flash bulb simultaneously from the batteries, said switch including a movable circuit closing member having an electrical connection to the other end of the solenoid coil positioned to engage the casing, when the switch is open to short circuit the solenoid coil except when it is energized.

WILLIAM A. STEENBERGEN.

REFERENCES CITED

The following references are of record in the file of this patent:

UNITED STATES PATENTS

| Number | Name | Date |
|---|---|---|
| 2,135,506 | Hansch et al. | Nov. 8, 1938 |
| 2,204,424 | Mendelsohn | June 11, 1940 |
| 2,240,813 | Steenbergen | May 6, 1941 |
| 2,263,046 | Mendelsohn et al. | Nov. 18, 1941 |
| 2,292,894 | Mendelsohn | Aug. 11, 1942 |
| 2,328,831 | Mendelsohn | Sept. 7, 1943 |
| 2,333,370 | Graham | Nov. 2, 1943 |

FOREIGN PATENTS

| Number | Country | Date |
|---|---|---|
| 354,291 | Germany | June 6, 1922 |